United States Patent [19]

Silver et al.

[11] 4,171,680

[45] Oct. 23, 1979

[54] PACKAGED DISPOSABLE ANIMAL WASTE CONTAINER

[76] Inventors: Jules Silver; Russell E. Rhodes, both of P.O. Box 1188, Norwich, Conn. 06360

[21] Appl. No.: 829,477

[22] Filed: Aug. 31, 1977

[51] Int. Cl.$^2$ ............................................. A01K 29/00
[52] U.S. Cl. ...................................................... 119/1
[58] Field of Search ............................................. 119/1

[56] References Cited

U.S. PATENT DOCUMENTS

| | | | |
|---|---|---|---|
| 3,141,441 | 7/1964 | Russell | 119/1 |
| 3,745,975 | 7/1973 | Prucha | 119/1 |
| 3,752,120 | 8/1973 | Pallesi | 119/1 |
| 3,752,121 | 8/1973 | Brazzell | 119/1 |
| 4,030,448 | 6/1977 | Nuttall | 119/1 |

*Primary Examiner*—Louis G. Mancene
*Assistant Examiner*—Daniel J. Leach
*Attorney, Agent, or Firm*—Murray & Whisenhunt

[57] ABSTRACT

There is provided a packaged disposable animal waste container which has in packaged combination an open-top moisture resistance receptacle of such size that an animal may stand in the receptacle and with side walls sufficiently low that the animal may step into the receptacle, but sufficiently high that normal animal pawing will not displace animal waste and the like therefrom. Packaged within the receptacle are a plurality of nested trays each having dimensions so that the trays closely fit within the receptacle side walls. The trays also have side walls sufficiently high for containing an effective layer of animal waste absorbent. The package has a removal retainer means for retaining the nested trays in the receptacle during shipping and handling. The nested trays are removed from the receptacle and serially placed in the receptacle for use by the animal. A soiled tray is removed and replaced by a clean tray. The receptacle has sufficient moisture resistance properties so as to prevent moisture transmission through at least the bottom of the receptacle during serial use of all of the trays by the animal.

20 Claims, 6 Drawing Figures

U.S. Patent  Oct. 23, 1979  Sheet 2 of 2  4,171,680
FIG.3
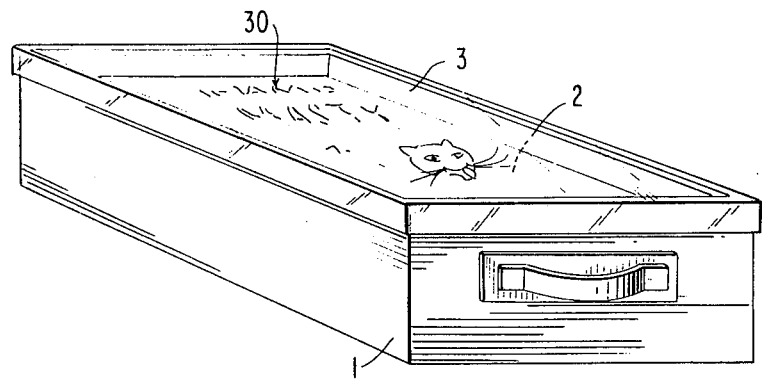
FIG.5
FIG.4
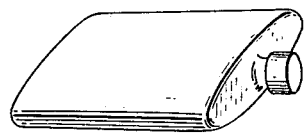
FIG.6
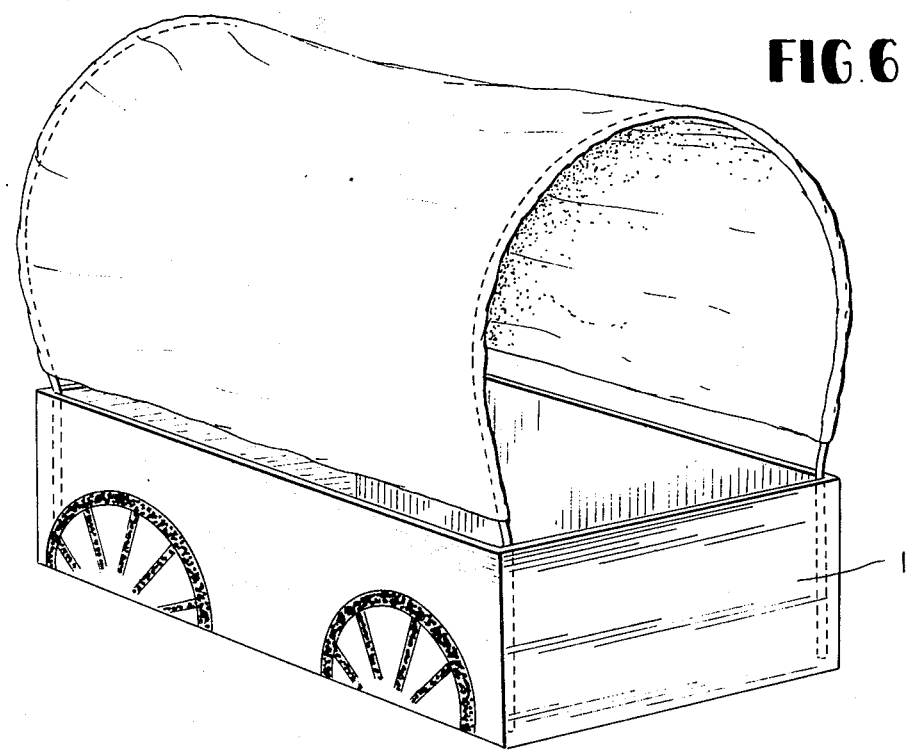

PACKAGED DISPOSABLE ANIMAL WASTE CONTAINER

The present invention relates to packaged disposable animal waste container and more particularly to such container which has particular utility for household pets, although the container may be used for caged animals, such as laboratory animals. Even more particularly, the invention relates to such packaged waste container where the package is capable of providing extended use by the animal.

BACKGROUND OF THE INVENTION

With the increasing shift of population from rural to urban centers, control and disposable of animal waste has become increasingly important. For typical household use the container must be large enough for the animal to deposit its waste but yet constructed in a manner which allows convenient disposal of the soiled container. The art has provided two different basic kinds of construction in this regard. In a first construction, a flexible sheet of moisture proof material is adapted to be spread upon a supporting surface, such as a floor, tray, box or the like, and retained thereby while the animal uses the same. The material is disposable by contacting the edges of the sheet so as to enclose the excrement and form the sheet into a suitable waste receptacle. In other words, this approach provides a flexible disposable waste container. U.S. Pat. No. 3,626,900 is typical of this arrangement.

The flexible containers suffer from several major disadvantages. Firstly, the requirement for a water proof flexible sheet connected with each container substantially increase the cost of each container. As can be appreciated, not only the materials involved, but the labor in construction contributes substantially to the increased cost. Another difficulty is that of folding the corners and otherwise handling the flexible sheet without spilling the waste or other material (e.g., absorbent) from the so-formed container. Disposing of these soiled flexible containers, at best, is unpleasant.

The second basic approach is exemplified by U.S. Pat. No. 3,386,417. This approach of the art provides a semi-rigid container in the essential shape of a tray. The purpose of the tray is to hold absorbent material and after reasonable use, the absorbent material is disposed of and the tray is washed for reuse. While this approach provides easier disposal of the excrement and soiled absorbent, as opposed to the flexible sheets, washing of the tray, for reuse is an unpleasant task. Generally, these trays are made of a plastic material of sufficient thickness to provide the semi-rigid characteristic and as such are too expensive to be a disposable item. Washing and reuse thereof is, accordingly, required for economic utilization of that waste container. However, even with washing, the trays tend to eventually retain an odor.

There are, of course, many variations of these two basic approaches in the art, and particularly in regard to the flexible sheet, which very often may contain absorbents, deodorants, and the like, e.g., see U.S. Pat. Nos. 3,626,899 and 3,284,273.

Equally important to the problems associated with disposing of the waste, is the problem of odor control in the used container. Here again, there are two basic approaches to odor control. The first approach, primarily associated with the flexible containers, is the inclusion of a deodorant and/or absorbent in the container itself. It is also possible to place particulate absorbent onto the flexible sheet, but this substantially increases the difficulty of folding and disposing of the so-formed container. Additionally, it is difficult, if not impossible, to keep the particulate matter on the flexible sheet when simply placed on the floor. Odor control in flexible containers substantially increase the cost of those containers, beyond that discussed above, and even so result in limited use of the container before the odors become objectionable.

The semi-rigid containers, as described above, may contain absorbent material, but any waste, particularly urine, which can pass through that absorbent material can collect onto the plastic impervious tray and quickly produce disagreeable odors. For these approaches, substantial amounts of masking compounds, deodorants and the like are generally required, either as originally contained in the absorbent material or as added thereto. Even with the further addition of the masking compounds or deodorants, limited use by the animal can often cause disagreeable odors which require emptying of the semi-rigid container, washing and refilling with new absorbent material.

As can therefore be appreciated, each of these basic approaches in the art suffer from their own disadvantages. It would be desirable to provide an animal waste container which combines the advantages of each, while avoiding the disadvantages of each. It would further be desirable to provide such containers where the cost of manufacture is less than the flexible container and the convenience of use is greater than the semi-rigid container.

OBJECTS OF THE INVENTION

Therefore, it is an object of the invention to provide a packaged disposable animal waste container which requires no reuse washing and is as convenient for disposing of the waste as the semi-rigid container, but is less expensive than the disposable flexible container. It is a further object of the invention to provide such container which allows extended use, i.e., use considerably longer than either the flexible container or the semi-rigid container. It is a further object of the invention to provide such container where disposing of the waste is simplified and is considerably less disagreeable than the disposing required for either the semi-rigid or flexible containers. Other objects will be apparent from the following description and claims.

BRIEF DESCRIPTION OF THE INVENTION

The invention is based on several distinct features. Firstly, the package of the invention comprises three main parts: an open-top receptacle; a plurality of disposable trays which in the package are nestable in the receptacle, but in use are serially placed in and removed from the receptacle after being soiled by the animal; and a retainer for holding the nested trays in the receptacle during shipping and handling. Thus, as a complete package, the container will provide extended use by serially removing a tray which has reached its optimum soil level and replacing with a fresh tray. The receptacle has a moisture resistant property such that all of the trays packaged in the receptacle may be used before that moisture resistance is substantially deteriorated.

Another basic feature of the invention is that the receptacle has dimensions such that the animal may stand in the receptacle, but at the same time the side walls of the receptacle are high enough that the normal pawing of the animal after elimination of waste will avoid displacement of the waste from the receptacle or even avoid a substantial displacement of particulate animal waste absorbent which may be held on a tray in the receptacle.

Finally, as a further important feature, the trays are configured so that they closely fit within the receptacle side walls so that in use the likelihood of waste being disposed out of the tray is slight. Accordingly, by this arrangement, the receptacle need have no special provisions, other than the moisture resistant provisions as noted above.

Thus, there is provided a packaged disposable animal waste container comprising an open-top disposable moisture resistant receptacle having a bottom with a length and width such that an animal may stand in the receptacle and side walls sufficiently low in height that the animal may step into the receptacle, but also sufficient in height that normal animal pawing will not substantially displace animal waste or particulate animal waste absorbent from the receptacle. A plurality of disposable trays are nested in the receptacle, each tray having a maximum length and width such that the tray closely fits within the receptacle side walls. The tray also has side walls sufficiently high that an effective layer of particulate animal waste absorbent may be contained on the tray. There is also provided a removable retainer means for retaining the nested trays in the receptacle during handling and shipping. Thus, the retainer means and the plurality of nested trays are serially placeable in and subsequently removable from the receptacle as soiled trays. The moisture resistance of the receptacle is at least sufficient to substantially prevent moisture transmission through at least the bottom of the receptacle through use of all of the plurality of trays.

BRIEF DESCRIPTION OF THE DRAWINGS

FIG. 3 shows a package similar to FIG. 1, but with a different retainer means.

FIG. 4 shows another embodiment of a suitable tray, which will require a similar receptacle (not shown).

FIG. 5 shows an embodiment where a container of deodorant is included in the package.

FIG. 6 shows an embodiment where the package also includes a "privacy" screen, which is disposed over the receptacle.

DETAILED DESCRIPTION OF THE INVENTION

Figure 1:
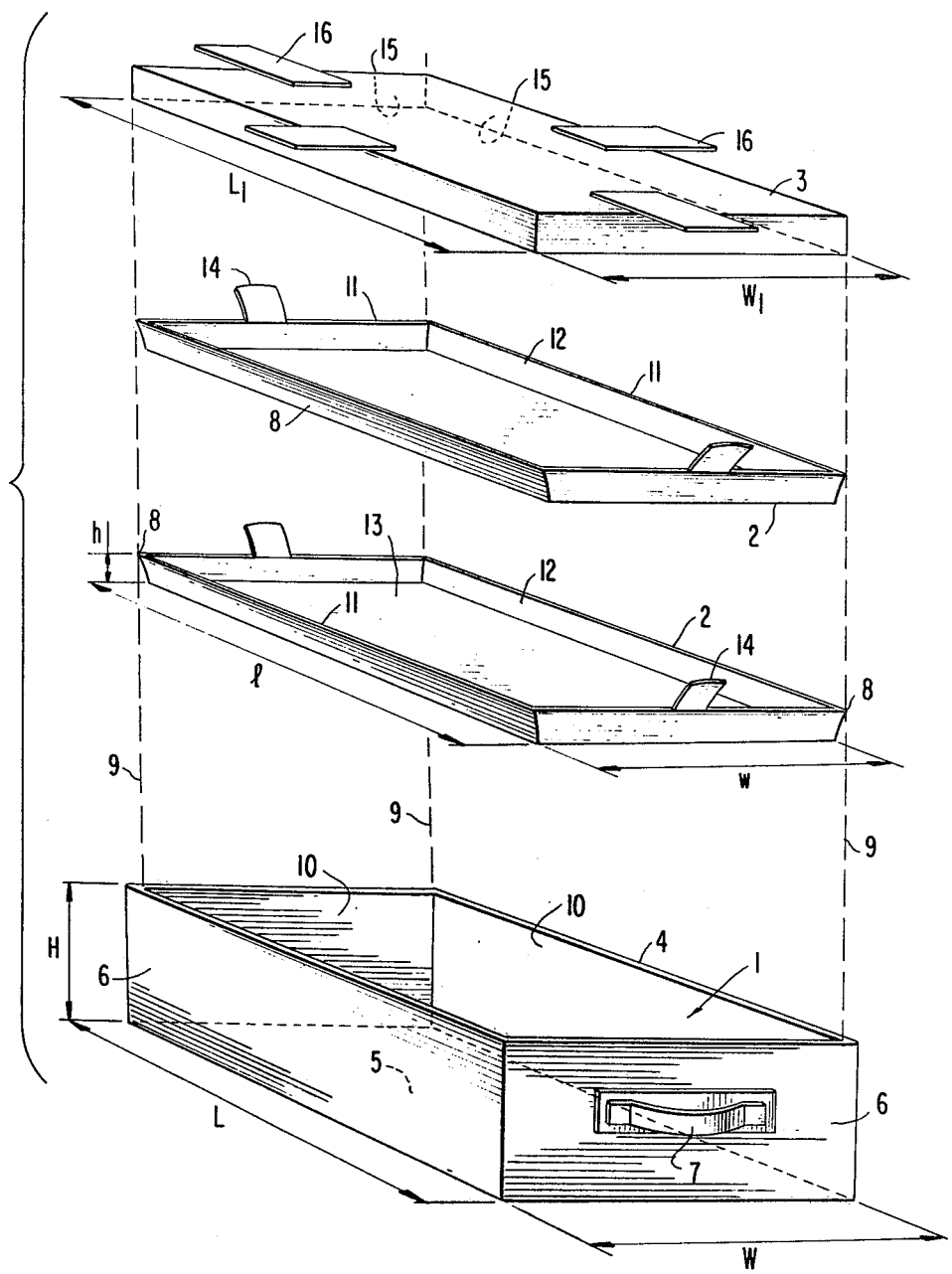
FIG. 1 is an exploded perspective view of the package of the invention.

As shown in FIG. 1, the invention comprises a receptacle 1, a plurality of trays 2 (two being shown in the drawing), and a retainer means 3. The receptacle 1 has an open-top 4 and a moisture resistant bottom 5. The bottom has a length L and a width W such that the animal may stand in the receptacle and side walls 6 sufficiently low in height H that the animal may step into the receptacle, but sufficiently high in height H that the normal animal pawing will not substantially displace animal waste or particulate animal waste absorbent from the receptacle.

It will be appreciated that L, W, and H will vary with the particular animal for which the container is designed. Thus, if the container is designed for a hamster, L could be as littled as 8 inches, W could be as little as 4 inches and H could be as little as 2 inches. On the other hand, if the container is designed for a large dog, L could be as large as 3 feet, W could be as large as 2 feet and H could be as large as 1 foot. For these larger sizes, the receptacle and a reasonable number of trays contained therein could weigh more than that which is comfortable to carry in the manner of carrying a box. For that purpose, with the larger sizes, the receptacle may be provided with a carrying handle 7, although this will not be necessary with the sizes and weight usual for household pets.

The invention is particularly applicable as a kitty litter container, since this is the household pet where containers of this nature are more often used, although the container is applicable to dogs, mice, hamsters, as well as other household pets including parrots, parakeets and the like. Thus, for purposes of the present specification and claims, the term "animal" is intended to embrace all pets, animals and birds, but for the sake of simplicity in the specification, reference is made only to animal and, hereinafter, reference is particularly made in connection with cats.

In addition to desiring a container for its waste, cats also have preference for animal "privacy." In this regard, the higher side walls of the receptacle provide an important advantage to the invention when used as a kitty litter container. Cats prefer the "privacy" of the higher side walls, and the natural tendency of the cat to paw the container or absorbent thereon does not create a problem with the present invention in that the higher side walls will retain substantially all of the pawed contents, container or absorbent. Thus, the litter is not displaced out of the receptacle by the cat.

While the above feature is particularly important for cats, it is easily appreciated that serially disposable containers of the size and nature of receptacle 1 would be prohibitively expensive. Thus, according to the present invention, the package includes a plurality of trays 2. While two trays are shown in the drawing, the number of trays may vary as desired. Usually, however, there will be at least three and up to fifty trays disposed in the packaged receptacle. More often, however, there will be at least six and up to thirty trays and usually between eight and twenty trays disposed in the packaged receptacle. The trays are considerably less expensive than the receptacle and thus replacement of a plurality of soiled trays makes the total package of receptacle and trays economically advantageous.

To minimize the volume of the packaged container, the plurality of disposable trays are configured so that they are nestable, one to the other, in the receptacle. The particular nesting configuration is not critical, and any of the conventional nesting configurations may be used. The drawing simply shows a beveled edge 8 on the trays so that the trays will nest within each other.

It is important that each tray have a maximum length l and width w such that the tray closely fits within the receptacle side walls 6 is as illustrated by spacial lines 9. Thus, in this case the maximum length and width will be at the apex of beveled edge 8. Optimally, the clearance between the inside 10 of side walls 6 will be as small as consistent with practical manufacturing tolerances. Ideally, the clearance between any apex of a bevel 8 and the inside 10 of side walls 6 will be less than 1/64 inch, but usually will be less than 1/32 inch. More practical manufacturing tolerances will provide that distance within ¼ inch. Thus, for purposes of the present specification and claims, the terms "closely fits" refers to the edges 11 of the trays 2 being within ½ inch of the inside 10 of side walls 6.

The height h of tray side walls 12 is sufficiently high that an effective layer of particulate animal waste absorbent may be contained on the tray. Thus, the height h will vary depending upon the particular absorbent which is desired for such use. For example, if the absorbent is in fine grandular form, height h may be as little as 1/32 of an inch, but for the more usual forms of particulate absorbent, height h will be at least ⅛ inch and more usually at least ¼ inch. Height h, of course, will depend in part upon the thickness of tray bottom 13. Where the tray and, of course, the tray bottom are made of relatively thick materials, such as pressed board and the like, h will normally be at least ½ inch and more usually about 1 inch or larger, i.e., up to 3 or 4 inches.

As can be appreciated, the trays may carry the particulate absorbent in order to maximize the amount of use, particularly in that the absorbent will help to control odor, as is well known in the art.

Since the trays will closely fit within the receptacle side walls, it is convenient, although not necessary, to provide the trays with lifting tabs 14 at the ends of the trays. This somewhat simplifies grasping and removing a soiled tray. Tabs may be in any desired configuration, but should be sufficiently flexible to provide convenient use thereof or should be oriented so that they are conveniently grasped. Other means may be used, e.g., hand or finger holes in the tray walls.

As a preferred form of the invention, the receptacle is in a generally rectangularly shape and the nestable trays are in a corresponding shape. In this configuration (as well as in other configurations) the ratio of the length L of the receptacle to the height H of the receptacle side walls 6 is between 1:1 and 10:1. This ratio will provide the more useful combinations of length of receptacle and height of side walls for most domestic animals and caged animals. Similarly, the ratio of the length l of the tray to the height h of the tray side wall 12 is between 5:1 and 50:1. Here again, these ratios will provide the more useful ratios for domestic animals and caged animals.

While the materials of construction of the receptacle and trays may vary widely, and include almost any of the conventional formable materials, it is preferred that the receptacle be constructed of resin containing corrugated paper-board, resin containing paste-board, resin containing press-board, resin containing papier-mache or plastic. As can be appreciated, each of these materials, with the exception of the plastic, are fibrous wood derived products and thus may be molded by typical fibrous wood derived product processes, e.g., formatious pressing of fibrous mats with or without vacuum assist and the like. These processes are well known to the art and need not be described herein. The processes are commonly practiced for producing packing cartons, e.g., egg cartons, meat trays for prepackaged meats, shock absorbing layers for delicate instruments and the like. Alternatively, preformed boards may be folded, glued, stapled, taped, and the like for constructing the receptacle. The more economical mode of construction is that of using either corrugated board or pressed board and folding in a conventional manner to form a folded box. This is a preferred form of the invention based on the favorable economics of this mode of construction.

The board must be resin containing, although the resin need not be evenly distributed throughout the board forming receptacle. Thus, only the board forming the bottom of the receptacle need be resin containing in order to provide a moisture resistance. Usually, at least part of the side walls will also be resin containing board so that moisture will not be transmitted therethrough. For ease of manufacture, the entire board is resin containing.

The resin may be evenly distributed throughout the cross section of the board but preferably it is only coated on one side of the board. The coated side may be on the inside of the receptacle, as noted above, or on the outside. Since the board may be constructed of a biodegradeable material, it is preferred that any coating be relatively thin, i.e., up to about 4 to 6 mils so that even if the animal eats the container it will not cause alimentary canal blockage. Also this will provide an essentially biodegradeable package, since the trays may be biodegradeable. When the board is one of the cellulosic fiber materials, the animals may consume the receptacle (a tray) without harm, and, indeed, this will add fiber to the diet. Papier-mache also may be used, and hereagain it is preferred that the glue thereof be biodegradeable, e.g., animal or fish or starch glue.

The resin contained in the board or mache may be any of the conventional moisture proofing resins, e.g., the terpene resins, wax, lacquers, e.g. pyroxylin, polyethylene, polypropylene, animal glue, fish glue, cereal glue, cellulosic resins (e.g., cellulose acid esters) and the like. When the resin is in the form of a coating, wax, polypropylene, polyethylene, lacquers, glues and cellulosic resins are preferred, although any coating resins, as desired, may be used.

As yet a further embodiment, the receptacle may be made of plastic, although this embodiment is more expensive than the foregoing embodiments. Nevertheless, where absolute assurance of moisture resistance is required, the more economical plastics such as foamed polystyrene, blow molded, vacuum formed and injection molded polyethylene, polypropylene, and polystyrene may be used.

Similar to the materials of construction used for the receptacle, the trays may be constructed of corrugated paper-board, paste-board, press-board, papier-mache or plastic. In this case, however, the trays may or may not be constructed of resin containing materials. It is not necessary for the trays to have resin containing material therein. In any event, if resin containing materials are used, it is preferred that the trays are constructed of resin coated pressed board with the coating on the underside of the trays so that the pressed board will additionally function as an absorbent.

Because of the absorbent nature of the trays as noted above, the trays may contain a deodorant therein, e.g., absorbed into the pressed board. The deodorant may be of the masking type or it may be a urine-reactive type which destroys the urine odor, both of which are well known in the art.

The retainer 3 encloses the plurality of nested trays 2 in receptacle 1 during handling and shipping of the package. However, to place the container in use, the removable retainer is removed so that the plurality of nested trays are removable from the receptacle. For this function, the retainer means may be chosen from a wide variety of materials and configurations. Thus, the retainer means may simply be tape or twine, but for a more pleasing package, the retainer means will normally totally cover open-top 4 of receptacle 1. Additionally, when retainer 3 is of special configuration and material, it may serve a dual function. Thus, where the retainer means is plastic film, aluminum foil, resin containing paper, resin containing corrugated board, resin containing paste-board, resin containing press-board, resin containing papier-mache or molded plastic, after removal it may be inverted and placed at the bottom of receptacle 1 to function as the moisture resistant element. In this case, length $L_1$ and the weight $W_1$ should be of dimensions consistent with fitting within the side walls 6 of receptacle 1 and also having dimensions of the inside walls 15 such that the trays 2 will fit therein. Thus, in this embodiment the retainer is closely fitable to the bottom of the receptacle and when so placed in the receptacle forms a moisture resistance for the receptacle.

With this arrangement, retainer 3 may be held to open-top 4 of receptacle 1 by any convenient attaching devices, such as tape tabs 16 as shown in the drawing. Any other desired locking device may be used, including clamps, taped edges, twine, screws, rivets, and the like.

Figure 2:
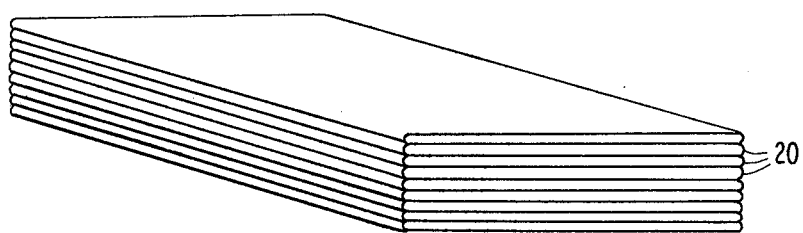
FIG. 2 shows an optional embodiment where the package contains bags for disposing of the soiled trays.

As a further embodiment, the package may contain a plurality of plastic bags 20, as shown in FIG. 2, which have dimensions such that a soiled tray is enclosable therein for sanitary disposition of the soiled tray. In this case, any particulate absorbent on the tray may be retained as the tray is removed from the receptacle and the tray and absorbent may be placed in one of the plastic bags. The bags are optionally provided with twist strips for closing the bag and disposing in normal city refuse. The bags may be made of any desired plastic, such as polyvinylchloride, polyethylene, polypropylene, and the like.

It can therefore be appreciated from the above description of the invention that when the retaining means has been removed from the receptacle, the plurality of nestable trays are removable from the receptacle and stored in a convenient place. A single tray is placed in the receptacle, along with absorbent or other materials as desired. After use by the animal to the extent that the tray and/or absorbent is unduly soiled, the tray is removed from the receptacle, preferably by the convenient lift tabs, and disposed of, preferably with one of the bags 20. A fresh tray is then serially placed in the receptacle and a fresh container is thereby provided. It is only necessary for this arrangement that the moisture resistance of the receptacle is at least sufficient to substantially prevent moisture transmission through at least the bottom of the receptacle through use of all of the plurality of the trays provided in the package.

It can be further seen that this arrangement provides a most convenient means of disposing of the animal waste. It also provides a very economical animal waste container. Finally, it provides a container which has substantially extended useful life. In this regard, after the plurality of trays have been serially used, then the receptacle is disposed of with the last tray and a new package of receptacle and plurality of trays is used for the animal waste.

The package provides a very convenient means of purchasing the container for extended use and is most convenient for transporting to the household.

FIG. 3 shows an optional feature of the invention. In this figure, receptacle 1 has a see-through clear retainer 3 thereon. That retainer shows trays 2 but in addition carries advertising, trademarks and the like 30 imprinted on retainer 3. This provides a very attractive package. In this embodiment retainer 3 overfits receptacle 1 and is not usable as the moisture resistance for receptacle 1.

FIG. 4 simply shows a tray 2 which is in an oval shape. This simply shows that shapes other than rectangular shapes may be used. Thus, as illustrated in FIG. 4, the shape may be oval, or the shape may be square or round, or any other desired shape.

FIG. 5 shows a container of deodorant which may be included in the package. The deodorant may be of the masking or perfume type or of the urine-reactive type such as that described in U.S. Pat. No. 3,816,577. The deodorant may be placed on particulate animal waste absorbent or on the absorbent trays. Suitable conventional particulate absorbents are disclosed in U.S. Pat. No. 3,816,577, the entire disclosure of which is incorporated herein by reference.

FIG. 6 shows a receptacle having a "privacy" screen for cats. As well known by veterinarians, some cats develop unusual "physiological" reactions to lack of "privacy" to the extent that elimination of waste is withheld and alimentary difficulties, even to compaction, result. The screen may be of any desired shape and affixed to the receptacle in any desired manner.

Thus, it can be seen that the objects of the invention are accomplished and that the invention provides advantages of both the semi-rigid and the flexible containers of the prior art, while avoiding the disadvantages of each. It is also apparent that the invention is amenable to various and obvious modifications. Those modifications are intended to be embraced by the spirit and scope of the annexed claims.

What is claimed is:

1. Packaged disposable animal waste container comprising:
    (a) an open-top disposable moisture resistant receptacle having a bottom with a length and width such that an animal may stand in the receptacle and side walls sufficiently low in height that the animal may step into the receptacle but sufficiently high in height that normal animal pawing will not substantially displace animal waste or particulate animal waste absorbent from the receptacle;
    (b) a plurality of disposable trays nested in the receptacle, each tray having a maximum length and width such that the tray closely fits within the receptacle side walls, said tray also having side walls sufficiently high that an effective layer of particulate animal waste absorbent may be contained on the tray;
    (c) removable retainer means for retaining the nested trays in the receptacle during handling and shipping; and
    (d) a plurality of plastic bags which have dimensions such that a soiled tray is encloseable therein for sanitary disposal of the soiled tray; and
    wherein the retaining means and the plurality of nested trays are removable and the trays are serially placeable in and subsequently removable from the receptacle as soiled trays, and wherein the moisture resistance of the receptacle is at least sufficient to substantially prevent moisture transmission through at least the bottom of the receptacle through use of all of the plurality of trays.

2. The package of claim 1 wherein the receptacle is in a generally rectangular shape and the nestable trays are in a corresponding shape.

3. The package of claim 1 wherein the ratio of the length of the receptacle to the height of the receptacle side walls is between 1:1 to 10:1.

4. The package of claim 1 wherein the receptacle is constructed of resin containing corrugated paper-board, resin containing paste-board, resin containing press-board resin containing papier-mache or plastic.

5. The package of claim 4 wherein the resin is coated only on one side of the board or mache.

6. The package of claim 5 wherein the receptacle is resin coated and folded corrugated paper-board.

7. The package of claim 3 wherein the ratio of the length of the tray to the height of the tray side walls is between 5:1 to 50:1.

8. The package of claim 1 wherein the trays are constructed of corrugated paper-board, paste-board, press-board, papier-mache or plastic.

9. The package of claim 8 wherein the trays are resin coated pressed board.

10. The package of claim 1 wherein the trays have lifting tabs at ends thereof.

11. The package of claim 1 wherein the trays contain a deodorant.

12. The package of claim 11 wherein the deodorant is urine-reactive to destroy the urine-odor.

13. The package of claim 1 wherein there are at least 3 and up to 50 trays disposed in the receptacle.

14. The package of claim 1 wherein there are at least 6 and up to 30 trays disposed in the receptacle.

15. The package of claim 1 wherein there are at least 8 and up to 20 trays disposed in the receptacle.

16. The package of claim 1 wherein the retainer means is plastic film, aluminum foil, resin containing paper, resin containing corrugated board, resin containing paste-board, resin containing press-board, resin containing papier-mache or molded plastic.

17. The package of claim 16 wherein the retainer is closedly fittable to the bottom of the receptacle and when so placed in the receptacle forms the moisture resistance for the receptacle.

18. The package of claim 1 wherein the receptacle has on the outside thereof a human hand size carrying handle.

19. The package of claim 1 wherein the package also includes a container of deodorant.

20. The package of claim 1 wherein the package also contains a privacy screen.

* * * * *